Aug. 27, 1968    H. G. J. DE BOER    3,398,635
METHOD AND APPARATUS FOR COPYING ORIGINALS DIAZOTYPE MATERIAL
Filed Aug. 23, 1965
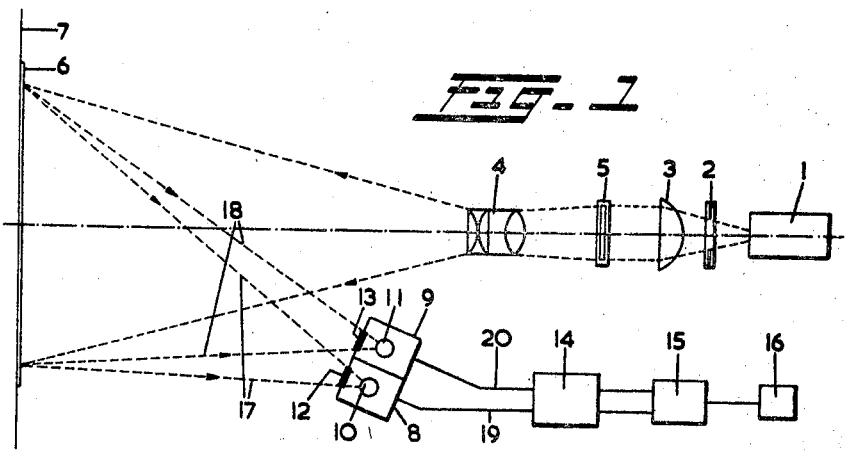
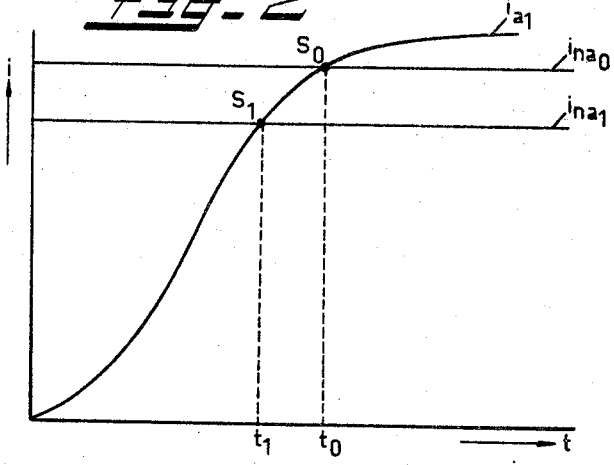
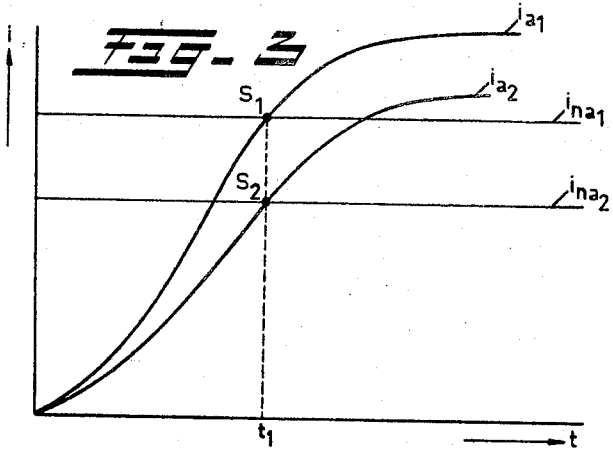
INVENTOR.
Henri Gerard Jean de Boer
BY
Wenderoth, Lind & Ponack
Attorneys ়
United States Patent Office 3,398,635
Patented Aug. 27, 1968

3,398,635
METHOD AND APPARATUS FOR COPYING ORIGINALS ON DIAZO-TYPE MATERIAL
Henri Gerard Jean De Boer, Delft, Netherlands, assignor to N.V. Lichtdrukpapierfabriek DE Atlas, Delft, Netherlands, a corporation of Netherlands
Filed Aug. 23, 1965, Ser. No. 481,629
Claims priority, application Netherlands, June 28, 1961, 266,457
5 Claims. (Cl. 88—24)

ABSTRACT OF THE DISCLOSURE

A method and apparatus for copying originals on diazo-type material using a source of light and a device for holding an original in a print position. A device is provided for holding plane diazotype material in a position for exposure through the original. A first and second light filter are each placed in a position to receive light re-emitted by one entire surface of the diazotype material. The first filter transmits only light which is actinic relative to the diazotype material and the second filter transmits only light which is non-actinic relative to the diazotype material. A first photoelectric element is located behind the first filter in the path of the light from the diazotype material through the first filter and a second photoelectric element is located behind the second filter in the path of the light from the diazotype material through the second filter. A device is provided for comparing the two electric currents, electrically connected to both of the photoelectric elements. A signalling device is connected with the comparison device to become operative when the values of the two electric currents have reached a predetermined relation. A shutter is interposed between the source of light and the device for holding an original, operated in response to a signal issued by the signalling device.

---

This invention relates to a method of adjusting the exposure time during the copying by transmitted light of originals, such as typed letters, printed matter, tracings, microfilm images and the like, on diazotype material in an exposure apparatus.

The invention also relates to apparatus for realizing such method.

The method according to the present invention is particularly useful when a series of originals have to be printed in succession.

Such originals may be of widely divergent nature. Thus, for example, they may carry a closely typed text or a small line drawing. Prior methods are based on measurements of light transmitted through a small portion of the diazotype material during the exposure thereof. The exactitude of the measurement is then dependent on whether the measures portion happens to have a greater or smaller area of shadow formed by the text.

It is an object of the present invention to provide means whereby to ensure that, once the apparatus to be employed has been properly adjusted to the specific type of diazotype material to be used, any required re-adjustment of the exposure time is effected automatically without requiring human intervention.

As an example, let us consider the copying of a series of images which together make up a microfilm. In making enlarged prints of such microfilm images, a beam of light is passed through them, which forms a light-and-shadow image on the diazotype material. This, accordingly, is a projection method, the original and the photosensitive diazotype material being spaced a certain distance apart. In this projection method I may utilize for the purposes of my invention both the light transmitted by the diazo-type material, and the light reflected by this material, the latter by virtue of the spacing between the original and the diazo material. For the sake of brevity, the description will be limited to reflected light, but the scope of the invention is not restricted to that case. In fact, the invention is equally applicable to contact printing, in which the original to be copied is in direct contact with the diazo material, and the image is not enlarged. In that case, it is only possible to utilize light transmitted by the diazo material.

Many sources of light, such as the sun, incandescent lamps, arc lamps, mercury vapour lamps, etc., produce light of various wavelengths. Diazotype material is sensitive to light of some wavelengths, which is called actinic light, and non-sensitive to light of other wavelengths, which is called non-actinic light.

The actinic light falling on the diazotype material is primarily for the greater part absorbed by this material, and effects a photo-chemical conversion therein (photolysis). The non-absorbed portion of the actinic light is reflected, and this is primarily only a small portion of the actinic light. As the conversion of the diazo material proceeds, the actinic light is absorbed to a decreasing extent, and reflected to an increasing extent.

The non-actinic light falling on the diazo material is also partly absorbed and partly reflected, but these amounts are constant.

In the prior method referred to above, the light transmitted by a small portion of the diazotype material passes through a light-filter and then falls on a photoelectric cell. The filter only transmits light to which the diazo material is sensitive, i.e., actinic light. The electrical energy produced by the photoelectric cell during the whole exposure of the diazotype material is integrated. This integrated quantity of electrical energy is then a measure for the quantity of actinic light transmitted by the diazo material during the whole exposure time. The exposure is terminated as soon as the integrated quantity of electrical energy reaches a predetermined reference value. This reference value is determined in a series of trial exposures with diazo material of the same type. In that case, no original can be placed between the source of light and the diazotype material, so that the diazo material is uniformly exposed throughout, i.e., without shadow images. In this way some trial exposure will give an exposure time in which the diazotype material is converted to the desired extent. During these experiments the quantity of electrical energy produced by the photoelectric cell is measured, integrated, and recorded. The integrated electrical energy measured during the correct exposure time is then the reference value for the subsequent exposures in normal use. In normal use, however, an original is interposed between the source of light and the diazotype material, so that the light image falling on the diazotype material shows shadow images. Thus, for example, a character of a typewritten text of the original will produce a corresponding shadow on the diazotype material. Where no light falls on the diazotype material, no light is of course transmitted by the diazotype material either.

In other words, according as the total area of the shadow images formed on the diazotype material is larger, less light is transmitted by the diazotype material. This means that per unit of time a smaller quantity of light is received by the photoelectric cell than when there was no original, and that it will accordingly be longer before the integrated quantity of electrical energy becomes equal to the reference value. The exposure time is then too long. The occurrence of this error is well-known, and it has therefore been recommended to effect the trial exposures with an original. It will be understood, however, that this can reduce the error, but not eliminate it. For the amount of text of an original to be reproduced will seldom be exactly equal to that of the original used in the trial exposures. For example, the trial exposures may have been effected with a typewritten text, and an original to be reproduced later may be a line drawing. Then the ratio between the total area of shadow and the total area of light on the diazo material has become quite different.

The present invention makes possible complete elimination of the error just described. According to the invention, too, the actinic light which is not absorbed by the diazo material is converted into electrical energy, but this is assayed continuously as to momental value per unit of time, as opposed to measuring the integral. Furthermore, this momental value is compared not with an earlier obtained fixed reference value, but with a variable reference value which automatically adapts itself to the total area of shadow producing portions of an original.

This variable reference value is obtained by measuring the non-actinic light reflected by the diazotype material during the whole exposure period. This is effected by means of a second photocell, which also continuously assays the momental value of the quantity per unit of time of the (non-actinic) light which falls on it. This value is constant during one whole exposure, but depends on the total amount of the text on the original concerned, which varies from original to original.

The luminous flux, i.e. the quantity of light per unit of time, which falls on the first photocell (for the assay of the actinic light) may vary in value through two causes. The first cause is the same as that just described in respect of the second photocell, namely, variation in the amount of text on the original which is being copied. The change in luminous flux of the actinic light falling on the first photocell which results from this is entirely proportional to the change in the luminous flux of the non-actinic light which falls on the second photocell, because their direct cause is the same. The second cause resides in the gradual conversion (photolysis) of the diazo material, as a consequence of which less and less actinic light is absorbed, and more and more actinic light reflected. The variation caused by this effect is a measure of the progress of the conversion process, and may be utilized for terminating the exposure at the proper time. The undesirable influence of the first cause is fully eliminated by subjecting the reference value provided by the second photocell to the same influence.

The present invention includes within its scope both a method and apparatus for realizing said method, and will be further described hereinafter with reference to the accompanying drawings, which are by way of illustration only, and not intended to limit the scope of the invention in any way.

In said drawings:

FIG. 1 shows the apparatus according to the invention diagrammatically.

FIGS. 2 and 3 show diagrams in which electric currents generated by the photocells are plotted as a function of the exposure time.

In the arrangement of FIG. 1 a source of light is indicated at 1, which light is controlled by a shutter 2. A condenser is designated at 3 and an objective at 4. 5 is a diapositive of which an enlargement is to be made. A sheet of diazotype material, shown at 6, is temporarily attached to a wall 7 which, for example, may be a suction wall. 8 and 9 are two boxes each containing a photocell shown at 10 and 11. In general said boxes 8 and 9 are light-tight. However, light may enter the boxes through light-filters provided in the front walls. These filters are shown at 12 and 13. The light-filter 12 is of the type which only transmits light which is actinic relative to the diazotype material used, whereas filter 13 only transmits light which is non-actinic relative to this material. The photocells 10 and 11 are both responsive to both actinic and non-actinic light. The outlet terminals of the photocells 10 and 11 are connected with a double amplifier 14 through lines 19 and 20. This amplifier is designed in such a way that the degree of amplification of each of the signals produced by the photocells can be controlled separately. The amplified signals are then passed to a comparison device 15. When this comparison device registers a specific relation between the magnitudes of the two signals, a signalling device 16 becomes operative to indicate that the end of the exposure time has come. The beam of light emanating from the source of light 1 may then be interrupted by means of shutter 2. If so desired, the shutter 2 can also be operated automatically by means of the signalling device 16.

The operation of the apparatus described above is as follows.

There will first follow a description of the adjustment of the apparatus to a selected kind of diazotype material, in which connection reference is made to FIG. 2.

In this case there is no diapositive 5, so that an even beam of light is directed on to a sheet of diapositive material. In principle the light directed on to such sheet is reflected in many directions. Thus a beam which is defined by lines 17 will fall on filter 12, and a beam defined by lines 18 on filter 13. Since filters 12 and 13 are disposed at some distance from the diazo material, and not, as in the prior method, in direct contact with a small portion thereof, they can receive light from the whole surface area of the diazo material. By definition, the photosensitive material used is only sensitive to actinic light, while the source of light 1, produces a mixture of actinic and non-actinic light. As the photosensitive material 6 initially absorbs the greater part of the actinic light falling on to it, the photocell 10 initially receives little or no light and accordingly produces hardly, if any, electric current. The trend of this current $i_{a_1}$ is shown in FIG. 2. The non-actinic light falling on said material 6, however, is reflected in a constant quantity from the very beginning of the exposure, so that photocell 11 produces a constant current $i_{na}$. As the exposure proceeds more diazo material 6 will be converted, and a greater quantity per unit of time of actinic light will be reflected on to the photocell 10. Accordingly, the current $i_{a_1}$ produced by the photocell 10 increases with increasing time $t$. The amplifier 14 is in a given position, at which the current produced by the photocell 11 is amplified to a value $i_{na_0}$, which is constant.

When the current $i_{a_1}$ has become equal to the current $i_{na_0}$ the exposure is terminated. The exposed photosensitive material is then developed an inspected. Let it be assumed that in this first test the exposure time $t_0$ turns out to have been too long, because the contrast between text and background is insufficient. A second test is then made, of course with the same type of photo-sensitive material, in which the amplifier 14 is adjusted to amplify the current produced by the photocell 11 to the value $i_{na_1}$. The actinic light causes a current which is still represented by the curve $i_{a_1}$. The exposure is again terminated when the current $i_{a_1}$ has become equal to $i_{na_1}$, i.e. has reached the value $S_1$. This corresponds with an exposure time $t_1$, which is shorter than $t_0$. It is now assumed that after development of the photosensitive material thus exposed the resulting print has the desired density. When the amplifier 14 is maintained in the position thus adjusted, it is possible to use all kinds of originals with the same kind of light-sensitive material, and obtain the proper exposure time for each individual original automatically. This will be further explained with reference to FIG. 3. This figure again shows lines $i_{a_1}$ and $i_{na_1}$, and point $S_1$, and it is assumed that the amplifier 14 is still in the position adjusted in the manner described above. A diapositive 5, which carries, a text, is now placed in the beam of light. As part of the light is intercepted by the text, a smaller luminous flux falls on the diazo material 6.

Accordingly the reflected luminous flux will also be less. Consequently, the non-actinic luminous flux which falls on photocell 11, is less, so that said photocell 11 does not produce a current $i_{na_1}$, but a smaller current $i_{na_2}$. The reduction in the exposed area of the diazo material 6, however, similarly affects the reflected actinic luminous flux. As a results the current produced by photocell 10 is no longer represented by curve $i_{a_1}$, but by curve $i_{a_2}$. The point of intersection of $i_{a_2}$ and $i_{na_2}$ is shown at $S_2$. Since the current $i_{a_1}$ is reduced to $i_{a_2}$ in the same proportion as current $i_{na_1}$ to current $i_{na_2}$, the point $S_2$ lies vertically beneath point $S_1$. When the comparison device 15 registers the equality of current $i_{a_2}$ and current $i_{na_2}$ which means that the exposure can be stopped, the exposure time $t_2$ is the same as before.

For the purposes of my invention, I may utilize various types of sources of light, photocells, filters and diazotype material. Some examples of these are mentioned below, without any intention to limit the scope of the invention in any way.

Sources of light

For making enlargements, i.e. by the method described hereinbefore I utilized a mercury discharge lamp, Type CS500 watt of Philips, Eindhoven, Netherlands.

Contact prints were made by means of an arc lamp and by means of a high-pressure mercury vapour lamp. The latter was of the type HOK3000 watt of Philips.

Photocells

I used both a selenium cell Kipp type E35 and a Philips phototube type 90AV. Both are responsive to both actinic and non-actinic light with respect to the conventional diazotype materials.

Filters (a) For the transmission of actinic light only, I used the following filters:

An interference filter for 404 m$\mu$ of Balzers, Liechtenstein. This filter has the following transmissions:

| | Percent |
|---|---|
| 365.5 m$\mu$ | 0.55 |
| 390.6 m$\mu$ | 8.4 |
| 404.7 m$\mu$ | 40.7 |
| 407.8 m$\mu$ | 32.9 |
| 435.8 m$\mu$ | 0.8 |

A so-called blue filter of Chance, Smithwick, England. This filter has the following transmissions:

| | Percent |
|---|---|
| 334.1 m$\mu$ | 1.3 |
| 265.5 m$\mu$ | 34.9 |
| 405 m$\mu$ | 59.9 |
| 407.8 m$\mu$ | 60.5 |
| 435.8 m$\mu$ | 60.2 |
| 546.1 m$\mu$ | 0.16 |

A so-called violet filter of Chance, Smithwick, England. This filter has the following transmissions:

| | Percent |
|---|---|
| 350.0 m$\mu$ | 7.0 |
| 365.5 m$\mu$ | 43.9 |
| 404.7 m$\mu$ | 28.8 |
| 435.8 m$\mu$ | 0.05 |
| 546.1 m$\mu$ | 0.0 |

(b) For the transmission of non-actinic light, I used the following filters:

A so-called yellow filter of Ilford, London, England. This filter has the following transmissions:

| | Percent |
|---|---|
| 435.8 m$\mu$ | 0.3 |
| 546.1 m$\mu$ | 90.1 |
| 578.0 m$\mu$ | 90.7 |

A so-called green filter of Ilford, London, England. This filter has the following transmissions:

| | Percent |
|---|---|
| 435.8 m$\mu$ | 0.5 |
| 546.1 m$\mu$ | 57.5 |
| 578.0 m$\mu$ | 35.6 |

Diazotype material

The diazo layers which I used comprised one or more of the following diazo components:

p-diazodiphenyl amine
p-diazo-o-halodialkyl aniline
diazo-dialkylhydroquinone having an etherified mercapto group in the para position with respect to the diazo group
p-diazo-o-alkoxydialkyl aniline
p-diazo-o-alkyldialkyl aniline
p-diazodialkyl aniline Light which is actinic with respect to these conventional diazo components consists of light of wavelengths from 350 m$\mu$ to 450 m$\mu$.

By way of illustration, one example of the use of the above-mentioned devices and materials will be described hereinafter.

EXAMPLE

I used a high pressure mercury vapour lamp of the type HOK 3000 watt. This lamp has a very broad spectral range. There are many strong lines between 250 m$\mu$ and 350 m$\mu$, and further various more isolated lines at 360 m$\mu$, 405 m$\mu$, 440 m$\mu$, 550 m$\mu$ and 580 m$\mu$. As a photocell, I used the selenium cell Kipp E34; as filter for the transmission of actinic light the Blue Filter of Chance, the transmissions of which are listed above; and as filter for the transmission of non-actinic light the Yellow Filter of Ilford, the transmissions of which are also listed above. The diazo layer comprised p-diazodialkyl anilines.

It follows from the fact that the diazo material used is sensitive to the spectral range of 350 m$\mu$ to 450 m$\mu$ that the light produced by the HOK 3000 watt lamp is partly actinic and partly non-actinic. The filter for the transmission of actinic light will transmit wavelengths of from 350 to 450 m$\mu$. The longer wavelengths, however, are filtered out. The filter for the transmission of non-actinic light, however, filters out wavelengths below 450 m$\mu$, and only transmits longer wavelengths, which in the example described means that this filter only transmits the spectral lines of about 550 m$\mu$ and about 580 m$\mu$. These are wavelengths of non-actinic light.

It will accordingly be seen that in this manner the light from one source can be reflected by one and the same area of the diazo material, and then split up into actinic and non-actinic light, which enables the comparative assay as described hereinbefore.

Though not shown, a fundamentally similar method can be carried out in which it is not the remitted light which is utilized but the light passing through the photosensitive material. In this case, too, the actinic light is at first fully absorbed and then to a decreasing extent, and the non-actinic light is transmitted in the same degree throughout the exposure time.

When the distance between the light filters and the photosensitive material is comparatively small, it may be useful to dispose a light diffuser between the photosensitive material and the light-filters to ensure that the filters are responsive to the total amount of remitted or transmitted light.

I claim:
1. A method of adjusting the exposure time during the copying by transmitted light of originals, such as typed letters, printed matter, tracings, microfilm images and the like, on diazo-type material in an exposure apparatus, in which, during the exposure, the light transmitted by an original falls on the diazo-type material and is partly re-emitted by said diazotype material, and in which a first part of the light re-emitted by the total surface of said diazotype material is continuously passed through a first filter which only transmits light which is actinic relative to said diazotype material, and a second part of the light re-emitted by said surface of the diazotype material is continuously passed through a second filter which only transmits light which is non-actinic relative to said diazotype material, the transmitted actinic light, the luminous flux of which increases during the exposure, is converted into a proportional first electric current, and the transmitted non-actinic light, the luminous flux of which is constant during the exposure, is converted into a proportional, second electric current, the exposure being discontinued when said two electric currents have reached a pre-determined relation.

2. In the manufacture of reproductions on diazotype material, a method of controlling the exposure time which comprises exposing said material to light which is actinic relative to said material and to light which is non-actinic relative to said material, continuously assaying separately the luminous flux of the actinic light and of the non-actinic light re-emitted by said material during the exposure and comparing the values found until a pre-determined relation between said values is reached, and then terminating the exposure.

3. An apparatus for copying originals, such as typed letters, printed matter, tracings, microfilm images and the like on diazotype material, comprising a source of light, means for holding an original in a print position, means for holding plane diazotype material in a position for exposure through such original, first and second light filter means each disposed in a position to receive light re-emitted by one entire surface of the diazotype material, said first filter means transmitting only light which is actinic relative to said diazotype material, and said second filter means transmitting only light which is non-actinic relative to said diazotype material, a first photoelectric element disposed behind said first filter means in the path of the light from the diazotype material through said first filter means, a second photoelectric element disposed behind said second filter means in the path of the light from the diazotype material through said second filter means, and means for comparing two electric currents, electrically connected to both said photoelectric elements.

4. An apparatus according to claim 3, and further comprising signalling means connected with said comparison means to become operative when the values of the two electric currents have reached a pre-determined relation.

5. An apparatus according to claim 3, and further comprising signalling means connected with said comparison means to become operative when the values of the two electric currents have reached a predetermined relation, and shutter means interposed between the source of light and the means for holding an original, said shutter means being operated in response to a signal issued by said signalling means.

References Cited

UNITED STATES PATENTS 2,968,214   1/1961   Kilminster _____ 88—24

NORTON ANSHER, *Primary Examiner.*

R. A. WINTERCORN, *Assistant Examiner.*